Patented July 22, 1941

2,250,256

UNITED STATES PATENT OFFICE 2,250,256

METHOD OF PRODUCING TRIMETHYLOLNITROMETHANE

Richard F. B. Cox, Wilmington, Del., assignor to Hercules Powder Company, Wilmington, Del., a corporation of Delaware No Drawing. Application October 25, 1939, Serial No. 301,233

10 Claims. (Cl. 260—635)

This invention relates to a method of producing trimethylolnitromethane and more particularly relates to a method of reacting nitromethane and formaldehyde in concentrated aqueous solution to produce trimethylolnitromethane.

Trimethylolnitromethane is a solid alcohol prepared by the condensation of nitromethane with formaldehyde. It was first prepared by L. Henry in 1895 (Compt. rend. 121, 210). Its preparation has been described by later investigators using various procedures for carrying out the reaction, various catalysts and various methods of recovery, etc.

In the previous methods of preparation the formaldehyde solution used for the reaction has contained up to about 40 per cent by volume of formaldehyde. To isolate the reaction product it has been necessary to evaporate the reaction solution to a point at which crystallization of trimethylolnitromethane will take place on cooling. In most cases the solution has been evaporated to dryness while in some cases evaporation to a point at which crystallization will occur has been carried out. During the evaporation step, the formation of color bodies occurs, and such color bodies contaminate the final product. The color bodies, usually consisting of tars and polymerization products of formaldehyde, are undesirable in the trimethylolnitromethane, since they seriously interfere in the uses of the product, such as in nitration to provide explosive compositions. Formation of tars and polymerization products also detracts from the yield of trimethylolnitromethane.

One object of this invention is to provide a method of producing trimethylolnitromethane which eliminates the step of concentrating the solution of the reaction product.

Another object of the invention is to provide a method of producing trimethylolnitromethane which avoids the formation of a large proportion of the color bodies formed in the prior art methods.

A further object of the invention is to provide an improved process for producing trimethylolnitromethane of high quality and in high yield.

Other objects of the invention will appear hereinafter.

These objects are accomplished by carrying out the reaction of nitromethane with an aqueous solution of formaldehyde containing from about 58 per cent to about 85 per cent by weight of formaldehyde and crystallizing the trimethylolnitromethane directly from the reaction solution without intermediate evaporation of the solution.

The nitromethane for use in this invention should be substantially free of other nitroparaffins or of aldehydes and ketones. The products obtained by direct nitration of methane or by the reaction of an alkali nitrite with a methyl halide, methyl hydrogen sulfate, dimethyl sulfate or a salt of chloracetic acid have been found to be satisfactory.

The formaldehyde is used as an aqueous solution containing from about 58 per cent to about 85 per cent by weight of formaldehyde and will preferably contain a small amount of methyl alcohol or other organic solvent to provide miscibility with the nitromethane. The formaldehyde may be used as an aqueous solution or dispersion of paraformaldehyde.

As a catalyst for the reaction any of the following types of materials or combinations thereof may be used, such as, for example, alkali metal carbonates, bicarbonates or hydroxides, alkaline earth metal hydroxides, salts of dimethylolnitromethane, etc. The hydroxides of alkaline earth metals are preferred, since their removal from the reaction mixture is simplified by precipitation as carbonates, oxalates, sulfates, etc.

The concentration of the formaldehyde solution employed is the factor determining whether the trimethylolnitromethane will crystallize out of the reaction solution directly. I have found that a concentration of formaldehyde from about 58 per cent to about 85 per cent by weight fulfills this purpose. A concentration of about 60 to about 75 per cent formaldehyde by weight is preferred.

The reaction temperature at which nitromethane and a concentrated solution of formaldehyde are brought together, in accordance with this invention, may be within the range of about 30° C. to about 100° C., and preferably within the range of about 50° C. to about 60° C. At the lower temperatures the reaction is quite slow, while at the higher temperatures the reaction is quite rapid and difficult to control and there is an increased formation of color bodies.

The proportion of formaldehyde to nitromethane is preferably held within a molecular ratio of about 2.75 to about 3.25 moles of formaldehyde for each mole of nitromethane. Within this range formation of the trimethylolnitromethane is favored and formation of nitroethanol and dimethylolnitromethane minimized.

According to the process described in accordance with this invention nitromethane and an aqueous solution of formaldehyde containing from about 58 per cent to about 85 per cent by weight of formaldehyde are brought together, preferably in the presence of a suitable catalyst, at a temperature within the range of about 30° C. to about 100° C., and preferably about 50° C. to about 60° C. Cooling of the reaction mixture is generally necessary to hold it within the above range of temperatures. When the reaction has subsided the mixture is allowed to stand and then after a few minutes is cooled to crystallize.

In order to effect crystallization, the mixture may be cooled to a temperature within the range of about 0° C. to about 17° C. to allow the trimethylolnitromethane to crystallize as the hydrate and the crystals separated. The mother liquor may then be returned to a subsequent batch. Alternately, the reaction mixture may be cooled to the range of about 17° C. to about 25° C. and the trimethylolnitromethane crystallized in anhydrous form and removed, the mother liquor being returned to a subsequent batch. If separation as the hydrate is carried out, the anhydrous trimethylolnitromethane may be obtained by melting the hydrate crystals by heating to above about 17° C. and recrystallizing. Crystallization as the hydrate will be found advantageous when the lower concentrations of formaldehyde are used and as the anhydrous product when the higher concentrations of formaldehyde have been employed.

The crystallized trimethylolnitromethane, or the hydrate thereof, may be separated from the mother liquor by any convenient means, such as by filtration, centrifuging, etc. The anhydrous product prepared from the hydrate may be separated from its mother liquor in a similar manner. After separation, the crude, crystalline anhydrous product will contain trimethylolnitromethane in crude form mixed with tars and polymerization products resulting from side reactions and formaldehyde polymerization with itself, although these impurities will be present in much smaller amount than in prior art processes involving higher reaction temperatures. The crude crystals may also be contaminated with formaldehyde. The latter may be removed conveniently by drying the crystals at a temperature of about 50° C., for example, in a mechanical convection oven. The salt of dimethylolnitromethane is also usually present in the crude crystals in small amount, being formed by interaction with the catalyst. Most of this salt is removed in the subsequent recrystallization process inasmuch as the salt is more soluble in the usual crystallizing solvents than is trimethylolnitromethane. For complete removal, the salt may be decomposed into dimethylolnitromethane and an inorganic salt. If an alkaline earth metal hydroxide has been used as a catalyst, the alkaline earth metal salt of dimethylolnitromethane may be decomposed into the alkaline earth metal carbonate and dimethylolnitromethane by treating the solution with carbon dioxide. The alkaline earth metal carbonate precipitate may be filtered from the hot solution before crystallization of trimethylolnitromethane takes place. The dimethylolnitromethane is removed in the filtrate.

The trimethylolnitromethane prepared in the above manner may be further purified by recrystallization from organic solvents. For use in nitration to produce nitrated derivatives having explosive properties, further purification is usually necessary. Organic solvents such as ethyl alcohol, ether, ethyl acetate or mixtures of ethyl acetate and chloroform are satisfactory. The trimethylolnitromethane remaining in the mother liquor after recrystallization may be recovered by using the mother liquor for subsequent recrystallizations.

The following examples illustrate the invention:

Example I

To a solution of 40 parts by weight of paraformaldehyde in 28 parts by weight of water containing 0.2 part by weight of sodium bicarbonate, 37 parts by weight of nitromethane were added in small quantities, holding the temperature at about 45° C. until there was no further reaction. The solution was then filtered and cooled. At 12° C. crystals formed in the form of plates whereas anhydrous trimethylolnitromethane crystallizes in needles. On cooling to 9° C., a thick slurry of crystals separated. These crystals, consisting of a hydrate of trimethylolnitromethane, were centrifuged off from the mother liquor and the mother liquor further cooled to 2° C. and the additional crop of crystals which separated centrifuged off. The crystals melted just below room temperature and gave off the combined water to form anhydrous trimethylolnitromethane. Removal of the water and drying of the crystals provided the trimethylolnitromethane in pure form.

Example II

To a solution of 180 parts by weight of paraformaldehyde in 102 parts by weight of water containing 0.4 part by weight of sodium hydroxide, 122 parts by weight of nitromethane were added gradually while maintaining the temperature of the reaction mixture at about 60° C. After the reaction had subsided, the solution was cooled to about 3° C., the trimethylolnitromethane crystallizing partly as a hydrate. The crystals were removed by filtration. After regeneration of the anhydrous material a yield of 136 parts by weight of trimethylolnitromethane having a melting-point of 139–147° C. was obtained. To the mother liquor 101.6 parts by weight of paraformaldehyde, 68.7 parts by weight of nitromethane and 0.4 part by weight of sodium hydroxide were added gradually, the temperature again being maintained at about 60° C. The formaldehyde and nitromethane added to the mother liquor correspond in amount to the trimethylolnitromethane removed in the first crystallization. After the second reaction had subsided, a similar separation procedure was carried out. The yield of anhydrous trimethylolnitromethane was 241 parts by weight on the second crystallization, the melting-point being 142–153° C. The mother liquor may be used in another reaction.

The method of producing trimethylolnitromethane in accordance with this invention eliminates the step of concentrating the reaction solution which has always been necessary in the prior art procedures. It is well known that the concentration step of the prior art methods gives rise to a large amount of color bodies. My process, by eliminating the concentration step, also eliminates most of the color body formation. The product which I obtain directly by crystallization from the reaction solution is of considerably higher purity than produced in the prior art procedures.

It will be understood that the details and examples hereinbefore set forth are illustrative only and that the invention as herein broadly described and claimed is in no way limited thereby.

What I claim and desire to protect by Letters Patent is:

1. The method of producing trimethylolnitromethane which comprises reacting nitromethane with an aqueous solution of formaldehyde containing from about 58 per cent to about 85 per cent by weight of formaldehyde and crystallizing trimethylolnitromethane directly from the reaction mixture without intermediate evaporation of the solution.

2. The method of producing trimethylolnitromethane which comprises reacting nitromethane with an aqueous solution of formaldehyde containing from about 58 per cent to about 85 per cent by weight of formaldehyde, the ratio of formaldehyde to nitromethane being about 2.75 to 3.25 moles of formaldehyde to 1 mole of nitromethane, and crystallizing trimethylolnitromethane directly from the reaction mixture without intermediate evaporation of the solution.

3. The method of producing trimethylolnitromethane which comprises reacting nitromethane with an aqueous solution of formaldehyde containing from about 58 per cent to about 85 per cent by weight of formaldehyde at a temperature within the range of about 30° C. to about 100° C., the ratio of formaldehyde to nitromethane being about 2.75 to 3.25 moles of formaldehyde to 1 mole of nitromethane, and crystallizing trimethylolnitromethane directly from the reaction mixture without intermediate evaporation of the solution.

4. The method of producing trimethylolnitromethane which comprises reacting nitromethane with an aqueous solution of formaldehyde containing from about 58 per cent to about 85 per cent by weight of formaldehyde at a temperature within the range of about 50° C. to about 60° C., the ratio of formaldehyde to nitromethane being about 2.75 to 3.25 moles of formaldehyde to 1 mole of nitromethane, and crystallizing trimethylolnitromethane directly from the reaction mixture without intermediate evaporation of the solution.

5. The method of producing trimethylolnitromethane which comprises reacting nitromethane with an aqueous solution of formaldehyde containing from about 58 per cent to about 85 per cent by weight of formaldehyde, crystallizing trimethylolnitromethane directly from the reaction mixture without intermediate evaporation of the solution, returning the mother liquor to a subsequent reaction mixture and repeating the same procedure.

6. The method of producing trimethylolnitromethane which comprises reacting nitromethane with an aqueous solution of formaldehyde containing from about 58 per cent to about 85 per cent by weight of formaldehyde at a temperature within the range of about 30° C. to about 100° C., the ratio of formaldehyde to nitromethane being about 2.75 to 3.25 moles of formaldehyde to 1 mole of nitromethane, crystallizing trimethylolnitromethane directly from the reaction mixture without intermediate evaporation of the solution, returning the mother liquor to a subsequent reaction mixture and repeating the same procedure.

7. The method of producing trimethylolnitromethane which comprises reacting nitromethane with an aqueous solution of formaldehyde containing from about 58 per cent to about 85 per cent by weight of formaldehyde at a temperature within the range of about 30° C. to about 100° C., the ratio of formaldehyde to nitromethane being about 2.75 to 3.25 moles of formaldehyde to 1 mole of nitromethane, and crystallizing trimethylolnitromethane directly from the reaction mixture as a hydrate by cooling the solution to a temperature within the range of about 0° C. to about 17° C.

8. The method of producing trimethylolnitromethane which comprises reacting nitromethane with an aqueous solution of formaldehyde containing from about 58 per cent to about 85 per cent by weight of formaldehyde at a temperature within the range of about 30° C. to about 100° C., the ratio of formaldehyde to nitromethane being about 2.75 to 3.25 moles of formaldehyde to 1 mole of nitromethane and crystallizing trimethylolnitromethane directly from the reaction mixture without intermediate evaporation of the solution by cooling the solution to a temperature within the range of about 17° C. to about 25° C.

9. The method of producing trimethylolnitromethane which comprises reacting nitromethane with an aqueous dispersion of paraformaldehyde containing from about 58 per cent to about 85 per cent by weight of formaldehyde and crystallizing trimethylolnitromethane directly from the reaction mixture without intermediate evaporation of the solution.

10. The method of producing trimethylolnitromethane which comprises reacting nitromethane with an aqueous dispersion of paraformaldehyde containing from about 58 per cent to about 85 per cent by weight of formaldehyde at a temperature within the range of about 30° C. to about 100° C., the ratio of formaldehyde to nitromethane being about 2.75 to 3.25 moles of formaldehyde to 1 mole of nitromethane, and crystallizing trimethylolnitromethane directly from the reaction mixture without intermediate evaporation of the solution.

RICHARD F. B. COX.